United States Patent
Tehrani et al.

[11] 3,756,220
[45] Sept. 4, 1973

[54] APPARATUS FOR WATER PURIFYING SYSTEM AND HEATER OF INCREASED EFFICIENCY

[76] Inventors: Mohammed N. Tehrani; Stratton W. Sundstrum; Richard A. Honorof, all of 5464 Yarmouth, No. 9, Encino, Calif. 91316

[22] Filed: Aug. 13, 1971

[21] Appl. No.: 171,458

[52] U.S. Cl............... 126/350, 55/220, 126/360 A, 137/604, 210/169, 210/205, 261/36 R, 261/DIG. 75
[51] Int. Cl............................ F24h 1/00, E04h 3/20
[58] Field of Search.................... 210/60, 169, 205; 137/114, 604; 55/DIG. 30, 41, 256, 255, 220; 261/DIG. 75, 36 R; 126/350, 360 A

[56] References Cited
UNITED STATES PATENTS

| | | | |
|---|---|---|---|
| 3,654,149 | 4/1972 | Hedgpeth | 210/169 X |
| 3,595,395 | 7/1971 | Lorenzen | 210/169 |
| 3,412,741 | 11/1968 | Mills | 210/169 X |
| 3,072,134 | 1/1963 | Williamson | 210/169 UX |
| 3,428,559 | 2/1969 | McInnis | 210/169 X |

*Primary Examiner*—Samih N. Zaharna
*Assistant Examiner*—T. A. Granger
*Attorney*—Lynn H. Latta

[57] ABSTRACT

Controlled injection of combustion products from a gas heater pressurized into a stream of water being circulated in a system such as the purifying circuit of a water reservoir, effects a controlled mild acidifying effect which maintains the water at a selected $P_H$ level for maintaining it in a purified condition, eliminating the need for the acid and reducing the requirement for chlorine additives commonly used in purifying the water of a pool. Application of suction to the heater's combustion chamber above its burner greatly increases heater efficiency.

3 Claims, 2 Drawing Figures

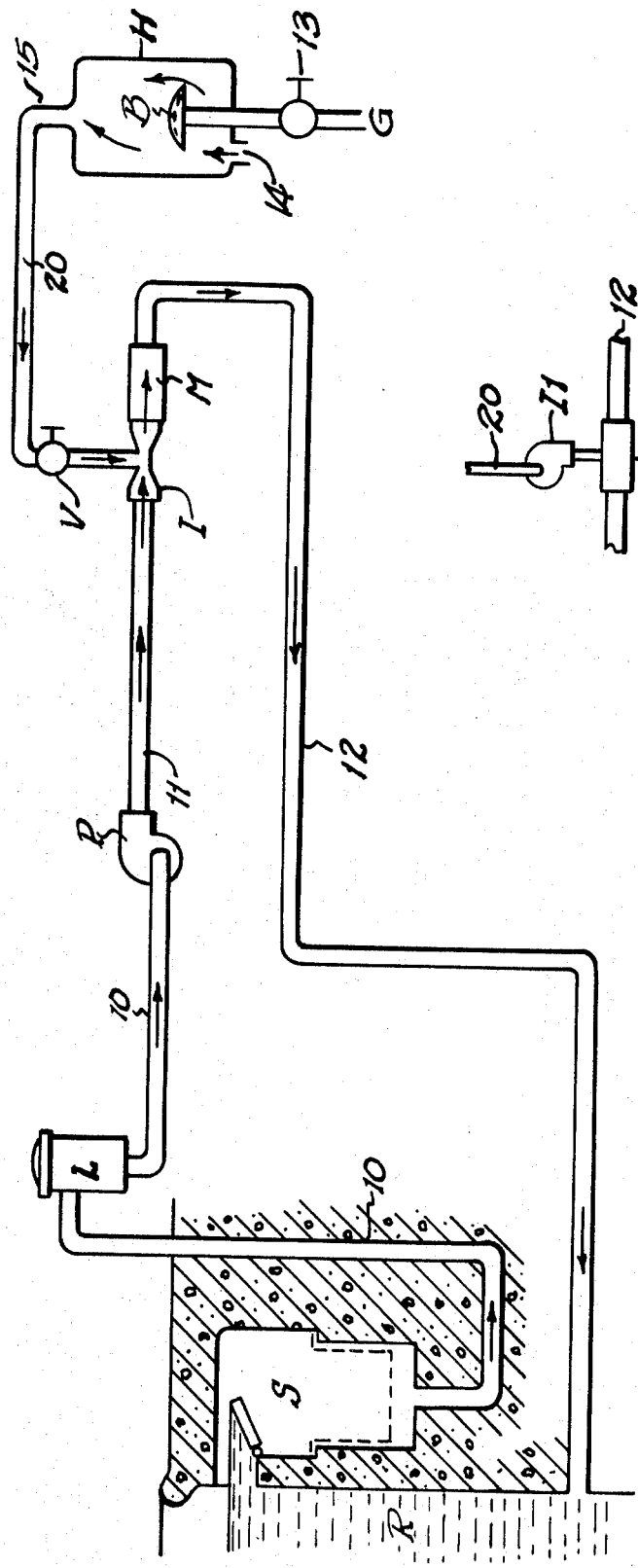

APPARATUS FOR WATER PURIFYING SYSTEM AND HEATER OF INCREASED EFFICIENCY

BACKGROUND OF THE INVENTION

The widely used method of inhibiting the growth of algae and bacteria in swimming pools is to periodically add muriatic acid and a chlorine releasing substance. Impurities in the chlorine chemicals commonly produce calcium deposits (scale) on the sides of the pool. The addition of acid tends to regulate the speed of chlorine break-down so as to inhibit the growth of scale, but if too much acid is used, the removal of plaster often results in etching, which appears as streaks on the plastered surface of the pool. Also, excess acid will develop electrolysis resulting in removal of copper from the tubing of the filter system, and the deposit of such copper on the pool walls in the form of a green coating which can be removed only by draining and acid-washing the pool.

U.S. Pat. No. 2,350,111, J.W.Hood, disclosed the introduction of carbon dioxide into raw sewage or untreated water prior to chemical treatment for clarification, for the purpose of pre-carbonating and adjusting the chemical balance of the liquid to economize on the amount of chemical normally consumed in clarification.

Williamson U.S. Pat. Nos. 3,251,357 and 3,072,134 disclose the introduction of carbon monoxide gas resulting from fuel combustion in a pool heater, for inhibiting the growth of algae.

McInnis U.S. Pat. No. 3,428,559 discloses the absorption, in a cascading water stream, of carbon dioxide in a hot gaseous stream of combustion products which also heats the cascading water.

Selmeczi U.S. Pat. No. 3,420,773 discloses a method of controlled removal of anions from water by providing a body of weakly basic anion exchange resin, introducing carbon dioxide into a stream of water flowing through the resin, and regulating the $CO_2$ flow to control the anion removal.

SUMMARY OF THE INVENTION

Our invention provides for the regulation of $P^H$ level in a water circulating and purifying system by controlled variable injection of the products of combustion of a burner pressurized into a mixing chamber in the flow line which recirculates the water from the reservoir through a purifying means, and thence back into the reservoir.

The general object of the invention is to provide an improved system for aiding in purification of water. Specific objects are:

a. to eliminate the amount of acid required in the water treatment;
b. to drastically reduce the amount of chlorine used in the treatment;
c. to maintain a satisfactory $P^H$ range automatically in relation to reservoir water circulation, without need for adding acid;
d. to improve efficiency of combustion heater operation;
e. to enhance clarification of reservoir water by stimulating the agglomeration of fine impurities into particles large enough to be removed in the filter or precipitated and swept up from the pool bottom in a routine cleaning operation;
f. to reduce accumulation of scale by reducing chlorine use and thus reducing precipitation of calcium from the water;
g. to reduce etching;
h. to avoid electrolysis from use of excess acid;
i. to reduce eye-burning and ear problems, hair bleaching and damage to bathing suits and other clothing arising from excess chlorine;
j. to reduce damage to plant life around a pool due to excess chlorine;
k. to reduce pipe corrosion, pump seal corrosion and other pump damage, heater damage, filter wear, etc. by reducing the large amounts of impurities added to pool water by conventional chemical treatment;
l. to substantially reduce the need for acid-washing a pool and hence to largely eliminate the need for re-plastering;
m. to produce soft water, low in calcium, iron and other minerals.

DESCRIPTION

These and other objects will become apparent in the following description and the accompanying drawing, in which;

FIG. 1 is a schematic diagram of a reservoir water circulating system embodying a preferred form of our invention; and FIG. 2 is a diagram of a modified form of the injection portion of the system.

Referring now to the drawing in detail, we have shown, as one form in which the invention may be embodied, a purifying system for a reservoir R shown in the form of a swimming pool having a skimmer unit S from which water is drawn through a suction line 10 and a lint pot L, into the suction inlet of a pump P; a connection 11 from the discharge outlet of the pump to a venturi I; and a return line 12 through which the filtered, chemically treated water is returned to reservoir R. A burner B (e.g. gas type) fed from a gas supply G through a control valve 13, develops heated gases of combustion which rise to a flue 15.

The invention provides an injection line 20 which withdraws the combustion gases from heater H and delivers them to return line 12 into which the gases are injected by the suction action of an injector I. At this point the gases are pressurized in a mixing chamber, causing the increased solubility of $CO_2$. In the preferred form of the invention shown in FIG. 1, the injector I is in the form of a venturi having its throat in communication with the injection line 20 so as to apply suction thereto. The volume of flow of combustion gases thus developed is regulated by a valve V which may be a gate valve.

The suction, in the injector, is generated by the flow of water in return line 12 which passes through injector I into a mixing chamber M in which the projects of combustion are mixed and pressurized with the water which is delivered by return line 12 to reservoir R.

Instead of a venturi, the injector may be a pump as designated at I1 in FIG. 2.

Major components of the combustion gases are carbon dioxide oxygen, and water in the form of steam. The carbon dioxide, being soluble in water, produces a weak solution of carbonic acid which is constantly fed into the reservoir R by return line 12 as long as the pool circulation system and heater are in operation. Valve V may be adjusted to regulate the rate at which carbonic acid is mixed with the circulating water stream, and by this means the addition of the weak acid can be regulated to just the rate required for maintaining $P_H$ levels (e.g. between 6.0 and 7.6) that are most suitable for maintaining the best water balance for inhibiting the growth of algae and bacteria, with no addition of pool acid. Since the addition of this acid is continuous as long as the water is being heated and circulated, the water balancing effect is automatic, requiring no action by an attendant, when the rate of addition has been properly adjusted at valve V.

The entry of carbon dioxide into the water in mixing chamber M also produces bicarbonates (e.g. calcium carbonate) of the minerals normally present in the water, which is effective to remove such minerals from the water, thus effecting a soft water condition which greatly reduces the deposit of scale on the pool wall.

The heater H is operated with an excess of oxygen, which not only provides a maximum approach to complete combustion (with consequent maximum production of heat from the fuel) but also results in some of the oxygen passing off with the products of combustion. This oxygen is carried into the reservoir R in solution thus providing an oxidizing effect which supplements that of the pool chlorine, thus reducing the need for chlorine. The action of the bicarbonates may also aid in killing algae and bacteria. This in turn reduces the introduction of impurities in the reservoir caused by the addition of chlorine.

The oxidizing effect of the oxygen introduced into chamber M is enhanced by the action of injector I, in which the water flow is speeded up in the verturi throat, with an intensified mixing and pressurizing effect on the combustion gases drawn into the throat.

The invention utilizes a new heating principle to provide a heater having maximum efficiency of operation, producing a greatly increased BTU output with a minimal gas consumption, over any presently known heater operation. This is accomplished by applying suction to the heater's combustion chamber above the burner so as to produce a forced draft which feeds an augmented supply of oxygen to the burner B, drawing it into the combustion chamber through a suitably positioned inlet 14, and removing the combustion products from the chamber so as to prevent their accumulation in the combustion area, thus maintaining an oxygen-rich atmosphere around the burner.

We claim:

1. In a system for withdrawing water from a reservoir, heating it, and returning it to the reservoir:
    a suction line for withdrawing water from the reservoir and a return line for returning the water to the reservoir;
    a pump disposed between said suction line and said return line, for inducing a recirculating flow of water in said lines;
    a combustion heater having a flue for discharge of combustion gases;
    a venturi in said return line, having a throat through which all of said flow continuously passes so as to generate suction therein;
    an injection line communicating at one end with said heater flue and at its other end with the throat of said venturi, whereby suction applied to said other end by said venturi is applied at said one end to said flue, thereby to operate said heater with an excess of oxygen for improved combustion efficiency and to withdraw therefrom combustion gases and said excess of oxygen which are drawn into said venturi by said suction and mixed with said return flow;
    and a rate of flow regulating valve located in said injection line, operable to provide a continuous flow of said combustion gases at a constant rate such as to maintain a pH level in said reservoir such as to inhibit algae growth without external addition of acid into said reservoir.

2. A purifying system as defined in claim 1:
    said suction line extending from the skimmer and lint pot of a swimming pool to the inlet of said pump;
    said system further including a connection from the outlet of said pump to said venturi;
    and said return line extending from said venturi to deliver the mixture of combustion gases and oxygen into the reservoir.

3. A purifying system as defined in claim 1, including:
    a mixing chamber at the outlet of said venturi, the mixture of combustion gases and oxygen being developed between the throat of said venturi and said mixing chamber.

* * * * *